(12) United States Patent
Kim et al.

(10) Patent No.: US 8,091,448 B2
(45) Date of Patent: Jan. 10, 2012

(54) MANIPULATOR WITH DISTRIBUTED ACTUATION MECHANISM

(75) Inventors: KyungSoo Kim, Daejeon (KR); YoungJune Shin, Kyungsangbuk-Do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 334 days.

(21) Appl. No.: 12/512,050

(22) Filed: Jul. 30, 2009

(65) Prior Publication Data

US 2010/0229669 A1    Sep. 16, 2010

(30) Foreign Application Priority Data

Mar. 16, 2009 (KR) .................. 10-2009-0022316

(51) Int. Cl.
*B25J 17/00* (2006.01)
*B25J 17/02* (2006.01)
*B25J 18/00* (2006.01)
(52) U.S. Cl. ................. 74/490.05; 74/490.01
(58) Field of Classification Search .............. 74/490.01, 74/490.03, 490.05, 490.06
See application file for complete search history.

(56) References Cited

U.S. PATENT DOCUMENTS

| | | | | |
|---|---|---|---|---|
| 5,060,532 A | * | 10/1991 | Barker | 74/490.01 |
| 5,379,664 A | * | 1/1995 | Kershaw et al. | 74/490.05 |
| 5,692,412 A | * | 12/1997 | Rosheim | 74/490.05 |
| 6,860,169 B2 | * | 3/2005 | Shinozaki | 74/490.06 |
| 2009/0320637 A1 | * | 12/2009 | Doyle et al. | 74/490.03 |

FOREIGN PATENT DOCUMENTS

| | | |
|---|---|---|
| JP | 10-217158 A | 8/1998 |
| JP | 2003-103480 A | 4/2003 |
| JP | 2005-169062 A | 6/2005 |
| WO | 2008/136402 A1 | 11/2008 |

OTHER PUBLICATIONS

Balasubramanian et al. "Biological stiffness control strategies for the Anatomically Correct Testbed (ACT) hand." Proceedings of the IEEE International Conference on Robotics and Automation, 2008, pp. 737-742.

Weghe et al., "The ACT Hand: design of the skeletal structure." Proceedings of the IEEE International Conference on Robotics and Automation, 2004, pp. 3375-3379 vol. 4.

Wilkinson et al., "An extensor mechanism for an anatomical robotic hand." Proceedings of the 2003 IEEE International Conference on Robotics and Automation, pp. 238-243.

(Continued)

*Primary Examiner* — Justin Krause
(74) *Attorney, Agent, or Firm* — Edwards Wildman Palmer LLP; Kongsik Kim

(57) ABSTRACT

The present invention relates to a manipulator having distributed mechanism for maximizing the performance of the manipulator. The manipulator is comprised of a first link; a second link; a joint for rotatably joining the first link and the second link each other; a connector having a first movable node at one end and a second movable node at the other end; a driver for providing power to linearly move the first movable node and the second movable node; and a guide for guiding the first movable node and the second movable node linearly.

The first movable node is connected to the first link and is capable of linearly moving and rotating with respect to the first link. The second movable node is connected to the second link and is capable of linearly moving and rotating with respect to the second link.

2 Claims, 5 Drawing Sheets

OTHER PUBLICATIONS

Mouri T. et al, "Unknown Object Grasping Strategy Imitating Human Grasping Reflex for Anthropomorphic Robot Hand", Journal of Advanced Mechancial Design, Systems, and Manufacturing, vol. 1, No. 1, 2007, pp. 1-11.

Gosselin C. et al, "An Anthropomorphic Underactuated Robotic Hand with 15 Dofs and a Single Actuator", 2008 IEEE International Conference on Robotics and Automation, Pasadena, CA, USA, May 19-23, 2008, pp. 749-754.

Saliba M et al, "Design of a compact, dexterous robot hand with remotely located actuators and sensors", 2007 Mediterranean Conference on Control and Automation, Jul. 27-29, 2007, Athens, Greece.

English J D et al, "Fault Tolerance for Kinematically Redundant Manipulators: Anticipating Free-Swinging Joint Failures", IEEE Transactions on Robotics and Automation, vol. 14, No. 4, Aug. 1998, pp. 566-575.

Zhang C et al, "A Novel Division Based Self-Motion Algorithm for Avoiding Obstacles for Redundant Manipulators", Proceedings of the IEEE International Conference on Automation and Logistics Aug. 18-21, 2007, Jinan, China, pp. 852-857.

Chung J H et al, "Modeling and Analysis of a Hybrid Mechanism with Kinematic and Force Redundancies", International Conference on Control, Automation and Systems 2007, Oct. 17-20, 2007 in Coex, Seoul, Korea, pp. 2170-2175.

Yi B J et al, "A Five-Bar Finger Mechanism Involving Redundant Actuators: Analysis and Its Applications", IEEE Transactions on Robotics and Automation, vol. 15, No. 6, Dec. 1999, pp. 1001-1010.

Ko H P et al, "A novel tiny ultrasonic linear motor using the radial mode of a bimorph", Elsevier, Sensors and Actuators A 125 (2006) 477-481.

Liu H et al., "The modular multisensory DLR-HIT-Hand", Elsevier Mechanism and Machine Theory, 42 (2007) pp. 612-625.

Yamano, Ikuo, "Five Fingered Robot Hand using Ultrasonic Motors and Elastic Elements", Proceedings of the 2005 IEEE International Conference on Robotics and Automation, Barcelona, Spain, Apr. 2005, pp. 2673-2678.

Kaneko K et al, "Development of Multi-fingered Hand for Life-size Humanoid Robots", 2007 IEEE International Conference on Robotics and Automation, Roma, Italy, Apr. 10-14, 2007, pp. 913-920.

Choi B et al, "Development of Anthropomorphic Robot Hand with Tactile Sensor : SKKU Hand II", Proceedings of the IEEE/RSJ International Conference on Intelligent Robots and Systems, Oct. 9-15, 2006, Beijing, China, pp. 3779-3784.

Maeno T and Hino T, "Miniature five-fingered robot hand driven by shape memory alloy actuators", Proceedings of the 12th Iasted International Conference, Robotics and Applications, Aug. 14-16, 2006, Honolulu, Hawaii, USA, pp. 174-179.

Rothling F et al, "Platform Portable Anthropomorphic Grasping with the Bielefeld 20-DOF Shadow and 9-DOF TUM Hand", Proceedings of the 2007 IEEE/RSJ International Conference on Intelligent Robots and Systems, San Diego, CA, USA, Oct. 29-Nov. 2, 2007, pp. 2951-2956.

Nishino S et al, "Development of Robot Hand with Pneumatic Actuator and Construct of Master-Slave System", Proceedings of the 29th Annual International Conference of the IEEE EMBS, Cite Internationale, Lyon, France, Aug. 23-26, 2007, pp. 3027-3030.

Zollo Z et al, "Biomechatronic Design and Control of an Anthropomorphic Artificial Hand for Prosthetic and Robotic Applications", IEEE/ASME Transactions on Mechatronics, vol. 12, No. 4, Aug. 2007, pp. 418-429.

Lee S H et al, "Performance Analysis and Optimal Actuator Sizing for Anthropomorphic Robot Modules with Redundant Actuation" Journal of Korean Mechanics Academic Association, 1995; 19(1), pp. 181-192.

Lee S M et al, "Torque Distribution Control of 3RRR Redundant Parallel Robot", Journal of the Korean Society for Precision Engineering, vol. 25, No. 2, Feb. 2008, pp. 72-79.

Kim S, "Operational Quality Analysis of Parallel Manipulators with Actuation Redundancy", Proceedings of the 1997 IEEE International Conference on Robotics and Automation, Albuquerque, New Mexico, Apr. 1997, pp. 2651-2656.

Park D et al, "Load Distribution using Weighted Pseudoinverse Matrix in Redundant Actuation", 2002, pp. 727-732.

Shin Y, "Application of Sliding Actuation Mechanism to Robot Finger." IEEE/ASME International Conference on Advanced Intelligent Mechanics, Singapore, Jul. 2009.

* cited by examiner

MANIPULATOR WITH DISTRIBUTED ACTUATION MECHANISM

CROSS-REFERENCE TO RELATED APPLICATION

This application claims the benefit of priority under 35 U.S.C. §119(a) to Korean Patent Application No. 10-2009-0022316, filed on Mar. 16, 2009, the entire contents of which are incorporated herein by reference.

BACKGROUND

1. Technical Field

The present invention relates to the actuation mechanism of manipulator for maximizing performance such as velocity and force by moving the forcing-points which produce torque.

2. Background Art

Robots are being used over a variety of industrial areas. In addition to industrial robots, a remotely-controlled robot with multipurpose and a humanoid robot which has as high degree of freedom (hereinafter, referred to as "DOF") as being capable of conducting various work in lieu of human is in demand and the research and development thereof are actively conducted recently.

In order to embody the various motion of a robot, a manipulator called a multi-joint arm including a plurality of articulated links joined together and actuators are commonly used. The actuators transform the energy into actual movement of the manipulator.

Redundant actuation mechanism is the mechanism with lower DOF than the number of actuators. While more difficult to control, larger and heavier than non-redundant mechanism, the redundant actuation mechanism is advantageous in several aspects such as avoidance of kinematical singularity, overcoming limit of velocity and input velocity, lessening impact force in contacting outer environment and avoidance of obstacle. The above-mentioned characteristics can be achieved by obtaining optimal solution from the given application purpose and environment.

As prior researches regarding to the redundant actuation mechanism, there are "Performance Analysis and Optimal Actuator Sizing for Anthropomorphic Robot Modules with Redundant Actuation" (The Korean Society of Mechanical Engineer, Vol. 19, No 1, pp. 181-192, 1995) which shows the performance improvement of a redundant actuation mechanism by comparing with a non-redundant actuation mechanism in terms of maximum load capacity, maximum velocity and maximum acceleration at an end-operator and "Operational quality analysis of parallel manipulators with actuation redundancy" (IEEE International Conference on Robotics and Automation, pp. 2651-2656, 1997) regarding the performance improvement of a manipulator by redundant actuation.

As further prior research regarding to distribution actuation mechanism, there are "A five-bar finger mechanism involving redundant actuators: Analysis and its applications" (IEEE Transactions on Robotics and Automation, Vol. 15, No. 6, pp. 1001-1010, 1999) regarding the effect to the working performance by the location of actuators and the number of used actuators in force distribution, "Load Distribution using Weighted Pseudoinverse Matrix in Redundant Actuation" (The Korean Society of Mechanical Engineer, 2002) regarding the force-distribution-method of a redundant actuation system by use of pseudoinverse matrix in 5-axis finger mechanism of the redundant actuation, and "Torque Distribution Control of 3RRR Redundant Parallel Robot" (Korean Journal of Precision Engineering and Manufacturing, Vol. 25, No. 2, pp. 72-79, 2008) regarding lowering maximum actuating torque by effectively distributing actuation input.

SUMMARY OF THE DISCLOSURE

Many links and joints used for embodying redundant actuation mechanism make the structure more complex, larger and heavier than the other types of mechanism. As a result, the redundant actuation mechanism has low output in spite of its big size.

The mechanism for optimizing the location of actuator has not been properly developed. Further, the working performance of the manipulator can be improved by distributing force (or torque) with structurally redundant actuation and by moving the location of the actuator (or the forcing-points). However, the mechanism reflecting these characteristic has not been developed as yet.

The object of the present invention is to overcome the problem by maximizing the performance of a manipulator with simultaneously applying the conventional redundant actuation mechanism and distributed actuation mechanism.

To accomplish this object, in one aspect, there is provided a manipulator with distributed actuation mechanism, the manipulator comprising: a first link; a second link; a joint for rotatably joining the first link and the second link; a connector having a movable node at one end and a fixed node at the other end, the movable node being provided in the first link and capable of linearly moving and rotating with respect to the first link, and the fixed node being provided in the second link and capable of rotating with respect to the second link; a actuator for providing power to linearly move the movable node; and a guide connected to the actuator for linearly guiding the movable node.

A manipulator with distributed actuation mechanism according to another embodiment of the invention comprises a first link; a second link; a joint for rotatably joining the first link and the second link; a connector having a first movable node at one end and a second movable node at the other end, the first movable node being provided in the first link and capable of linearly moving and rotating with respect to the first link, the second node being provided to the second link and capable of linearly moving and rotating with respect to the second link; actuators for providing power to linearly move the first movable node and the second movable node; guides connected to the actuators for guiding the first movable node and the second movable node linearly.

Preferably, the connector may be hydraulic or pneumatic operating device.

In a preferred embodiment, the actuators are provided in both of the first link and the second link, and the guides are provided in both of the first link and the second link.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Various features of the invention will be apparent by reference to the following description of various embodiments with reference to the drawings.

Figure 1:
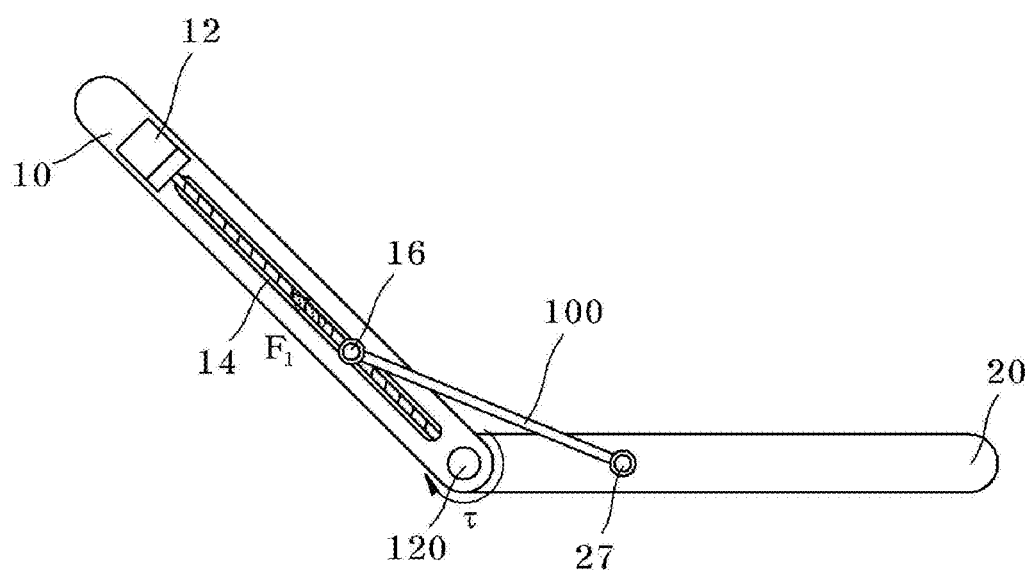
FIG. 1 shows a manipulator embodying distributed actuation mechanism with one actuator.

FIG. 1 shows a manipulator of the distributed actuation mechanism with one actuator.

The manipulator basically comprises a first link 10, a second link 20, a joint 120, a connector 100, an actuator 12, and a guide 14.

The first link 10 and the second link 20 are rotatably joined together at the joint 120. The connector 100 has a movable node 16 at one end and a fixed node 27 at the other end. The movable node 16 is provided in the first link 10 so as to be capable of linearly moving along the first link 10 and rotating with respect to the first link 10. The fixed node 27 is provided in the second link 20 so as to be capable of rotating with respect to the second link 20.

The actuator 12 is provided to move the movable node 16. Any device is available as the actuator 12 if it can move the movable node 16 linearly.

An actuator including linear ultrasonic motor, voice-coil motor, hydraulic motor or pneumatic motor is available for the distributed actuation mechanism if it can linearly move the forcing-point.

The movable node 16 is joined at the guide 14. The guide 14 is connected to the actuator 12 to transmit the power and/or torque of the actuator 12 to the movable node 16. That is, the guide 14 serves to guide the linear movement of the movable node 16.

The actuator 12 and the guide 14 are provided in the first link 10.

When the actuator 12 operates to pull the movable node 16 toward the actuator 12, the second link 20 moves toward the first link 10 by the force to applied to the connector 100. As a result, the angle between the first link 10 and the second link 20 decreases.

Figure 2:
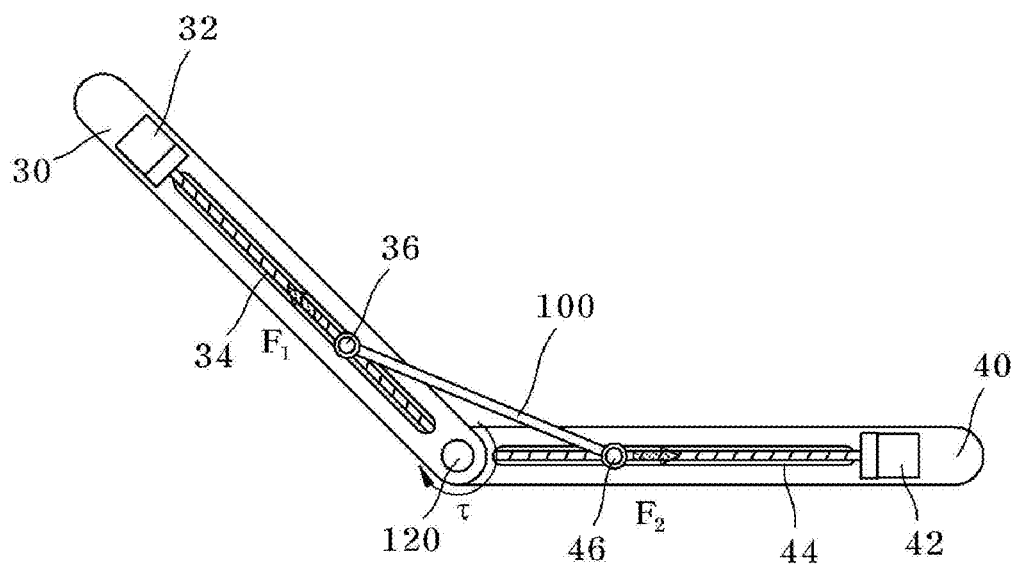
FIG. 2 shows a manipulator embodying distributed actuation mechanism with two actuators.

FIG. 2 shows a manipulator of the distributed actuation mechanism with two actuators. In this embodiment, the first link and the second link are referred to as new reference numerals for distinguishing this embodiment from the embodiment shown in FIG. 1.

The first link 30 and the second link 40 are rotatably joined together at the joint 120. The connector 100 has the first movable node 36 at one end and the second movable node 46 at the other end. The first movable node 36 is provided in the first link 30 so as to be capable of linearly moving along the first link 30 and rotating with respect to the first link 30. The second movable node 46 is provided in the second link 40 so as to be capable of linearly moving along the second link 40 and rotating with respect to the second link 40.

Actuators 32 and 42 are provided to move the first movable node 36 and the second movable node 46 respectively. Any actuator is available if it can move the movable nodes linearly.

The first movable node 36 is joined at the guide 34 and the second movable node 46 is joined at the guide 44. The guides 34, 44 are connected to the actuators 32, 42, respectively so as to transmit the power and/or torque of the actuator to the movable nodes. That is, the guides serve to guide the linear movement of the movable nodes.

The actuator 32 and the guide 34 are provided in the first link 30. The actuator 42 and the guide 44 are provided in the second link 40.

As described with reference to FIGS. 1 and 2, the feature of the present invention is to move the forcing-point (the movable node) along the link by using one or two actuators per a link of a manipulator. With this distribution of the forcing-point, the optimization for torque of the joint is accomplished.

The method to distribute forcing-point in operation of the embodiment of the present invention as illustrated in FIG. 2 is to move the ends of the connector linearly along the guide by using the actuator. If the actuators are provided in the first link and the second link and if the actuators are provided to move the ends of the connector, the forcing-point producing torque varies in accordance with the position of the movable node.

Figure 3:
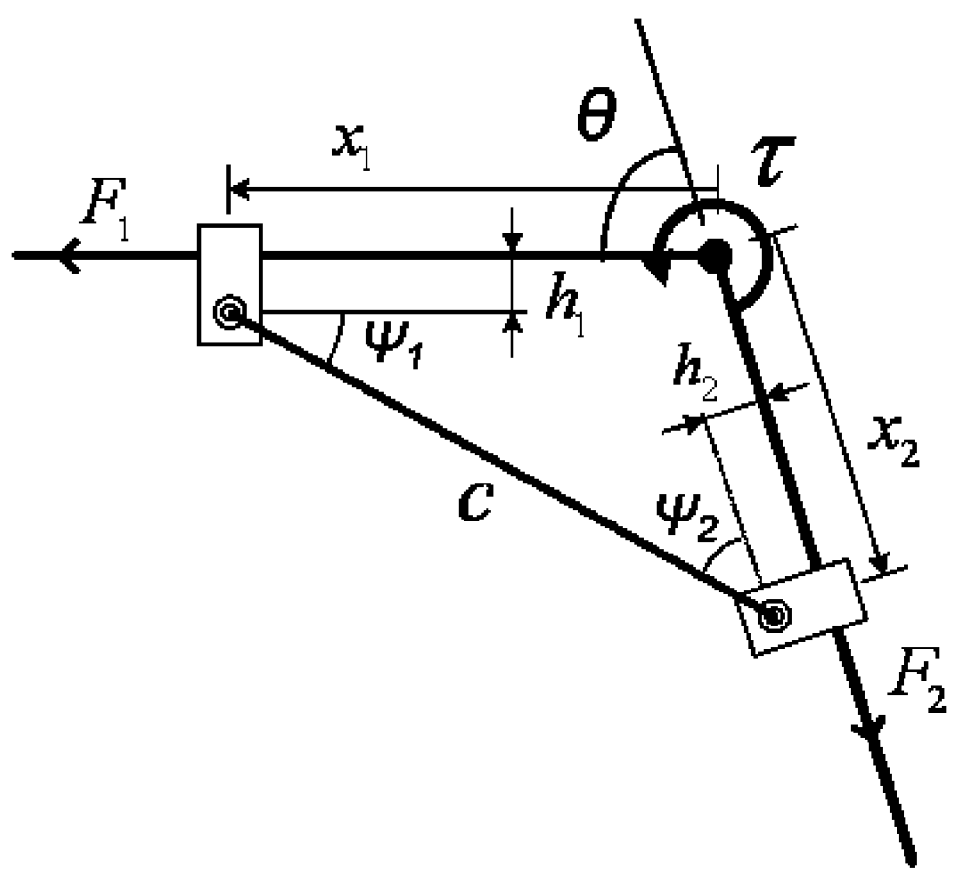
FIG. 3 shows notations for numerical analysis of the distributed actuation mechanism.

FIG. 3 shows notations for numerical analysis of the distributed actuation mechanism. When the thrusting forces are given by $F_1$ and $F_2$, the torque at each joint is described as follows:

$$\tau = \frac{F_1}{1 + \mu \tan\psi_1}(x_1 \tan\psi_1 + h_1) + \frac{F_2}{1 + \mu \tan\psi_2}(x_2 \tan\psi_2 + h_2)$$

where $\mu$ is the Coulomb friction coefficient, $$\psi_1 = \tan^{-1}\left(\tan\theta \sqrt{\frac{c^2 - x_1^2 \cos^2\theta}{c^2 + x_1^2 \sin^2\theta}}\right)$$

$$\psi_2 = \theta - \psi_1$$

$$x_2 = -x_1 \cos\theta + \sqrt{x_1^2 \sin^2\theta + c^2}$$

Where $x_1$ and $x_2$ are the distances of the movable nodes from the joint, c is the length of the connector, and $\theta = \psi_1 + \psi_2$, which is the joint angle. Note that if a joint angle $\theta$ is given, the variables $\psi_1$, $\psi_2$, and $x_2$ are uniquely determined by $x_1$, which implies that the joint torque is the function of the joint angle $\theta$ and the position of the movable node $x_1$.

Many actuators are needed in the conventional manipulator with mechanism in order to distribute input torque. However, the manipulator of the present invention is capable of moving (or distributing) the forcing-points with lesser actuator(s) than the conventional manipulator. Further, it has advantage of miniaturization through eliminating additional links and joints.

Further, because the torque of the joint is controllable in accordance with the position of the movable node although the actuator operates to output maximum power, the present invention has advantages of higher feasible range of power.

Figure 4:
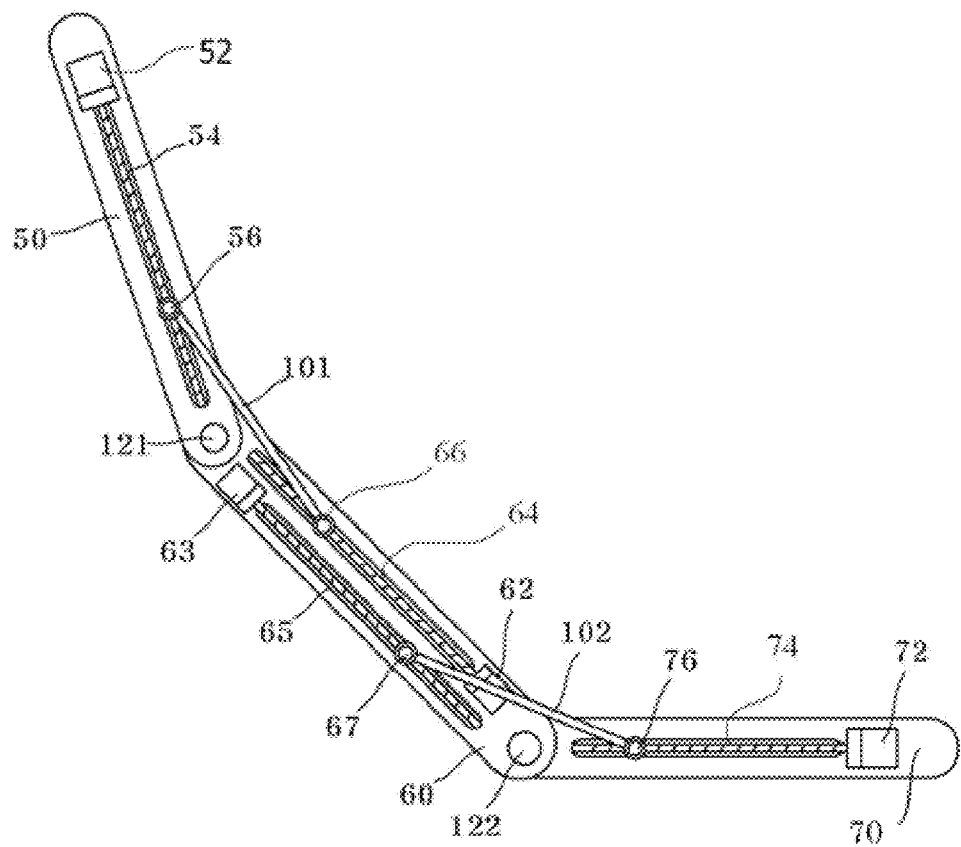
FIG. 4 shows a manipulator embodying distributed actuation mechanism with three links.

FIG. 4 shows a manipulator embodying distributed actuation mechanism with three links.

A first link 50, a second link 60 and a third link 70 are used in this embodiment.

The first link 50 and the second link 60 are rotatably joined together at the joint 121. The first connector 101 has the first movable node 56 at one end and the second movable node 66 at the other end. The first movable node 56 is rotatably provided at the first link 50. The second movable node 66 is rotatably provided at the second link 60.

Actuators 52 and 62 are provided to move the first movable node 56 and the second movable node 66, respectively. Any actuator is available if it can move the movable nodes linearly.

The first movable node 56 is connected to the guide 54. The guide 54 is also connected to the actuator 52. The guide 54 transmits the power and/or torque of the actuator 52 to the movable node 56 and also guides the linear movement of the movable node 56.

The second movable node 66 is connected to the guide 64. The guide 64 is also connected to the actuator 62. The guide 64 transmits the power and/or torque of the actuator 62 to the movable node 66 and also guides the linear movement of the second movable node 66.

The actuator 52 and the guide 54 are provided in the first link 50. The actuator 62 and the guide 64 are provided in the second link 60.

The second link 60 and the third link 70 are rotatably joined together at the joint 122. The second connector 102 has the third movable node 67 at one end and the fourth movable node 76 at the other end. The third movable node 67 is rotatably provided at the second link 60. The fourth movable node 76 is rotatably provided at the third link 70.

Actuators 63 and 72 are provided to move the third movable node 67 and the fourth movable node 76, respectively. Any actuator is available if it can move the each movable node linearly.

The third movable node 67 is rotatably connected to the guide 65. The guide 65 is also connected to the actuator 63. The guide 65 transmits the power and/or torque of the actuator 63 to the third movable node 67 and also guides the linear movement of the third movable node 67.

The fourth movable node 76 is rotatably connected to the guide 74. The guide 74 is also connected to the actuator 72. The guide 74 transmits the power and/or torque of the actuator 72 to the fourth movable node 76 and also guides the linear movement of the fourth movable node 76.

The actuator 63 and the guide 65 are provided in the second link 60. The actuator 72 and the guide 74 are provided in the third link 70.

As a result, two actuators, two guides and two movable nodes are provided in the second link 60.

Figure 5:
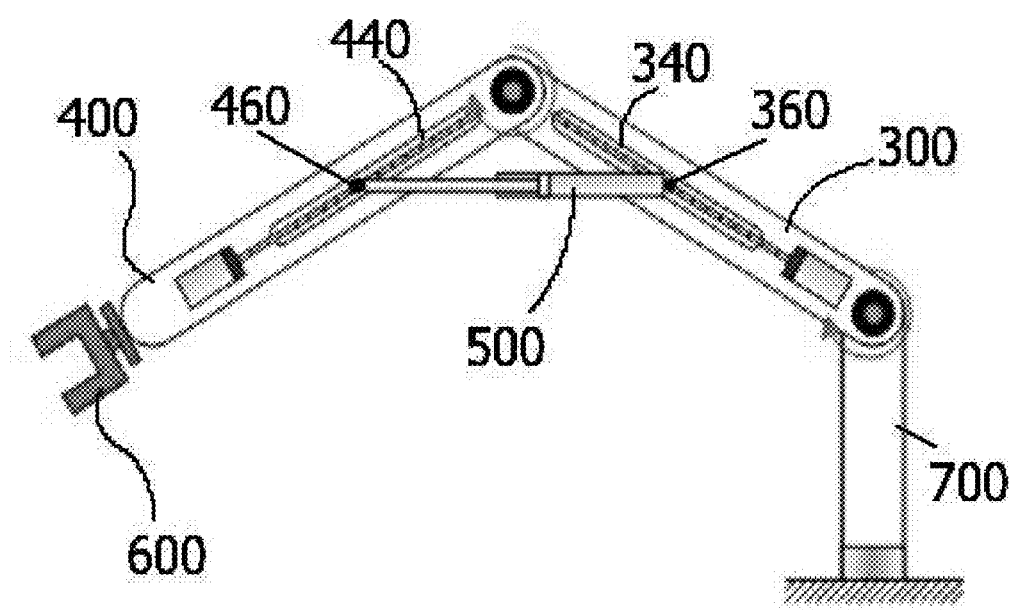
FIG. 5 shows an example of hydraulic manipulator employing the distributed actuation mechanism of the present invention.

FIG. 5 shows an example of hydraulic manipulator employing the distributed actuation mechanism of the present invention.

The hydraulic manipulator employing the distributed actuation mechanism has high power. In the hydraulic manipulator, the connector is replaced by a hydraulic device 500, and thus the available range of power increases further. As a result, it is possible to develop a small manipulator with high power.

The both ends of the hydraulic device 500 include the first movable node 360 provided in the first link 300 and the second movable node 460 provided in the second link 400.

The two movable nodes 360, 460 are rotatably provided in the first and second links.

The first link is rotatably joined to the base 700. An end-operator 600 is provided in the end of the second link 400. The end-operator means an apparatus connected the end of the manipulator, such as holder or welding device.

While the present invention has been described with reference to particular illustration embodiments, it is to be understood that the invention should not be limited thereby. It is to be appreciated that those skilled in the art can change or modify the embodiments without departing from the scope or spirit of the present invention.

What is claimed is:

1. A manipulator with distributed actuation mechanism, said manipulator comprising:
   a first link;
   a second link;
   a joint for rotatably joining said first link and said second link;
   a connector having a first movable node at one end and a second movable node at the other end, said first movable node being provided in the first link and capable of linearly moving and rotating with respect to the first link, said second movable node being provided in the second link and capable of linearly moving and rotating with respect to the second link;
   actuators for providing power to linearly move said first movable node and said second movable node; and
   guides connected to said actuators for guiding said first movable node and said second movable node linearly,
   wherein said actuators are provided in both of said first link and said second link, and said guides are provided in both of said first link and said second link.

2. The manipulator with distributed actuation mechanism as set forth in claim 1, wherein said connector is hydraulic or pneumatic operating device.

* * * * *